United States Patent [19]

Akao et al.

[11] Patent Number: 4,925,711

[45] Date of Patent: May 15, 1990

[54] PACKAGING BAG FOR PHOTOSENSITIVE MATERIALS AND BAG-MAKING METHOD THEREOF

[75] Inventors: Mutsuo Akao; Koji Inoue, both of Kanagawa, Japan

[73] Assignee: Fuji Photo Film Co., Ltd., Minami-Ashigara, Japan

[21] Appl. No.: 284,329

[22] Filed: Dec. 14, 1988

[30] Foreign Application Priority Data

Dec. 15, 1987 [JP] Japan .................. 62-317170

[51] Int. Cl.⁵ .................. B65D 30/08; B65D 30/14; B32B 27/08
[52] U.S. Cl. .................. 428/35.2; 206/524.1; 206/524.2; 383/109; 383/114; 383/84; 428/212; 428/515
[58] Field of Search .................. 428/212, 35.2, 515; 383/109, 114, 84; 206/524.1, 524.2

[56] References Cited

U.S. PATENT DOCUMENTS

| | | | |
|---|---|---|---|
| 4,147,291 | 4/1979 | Akao et al. | 229/3.5 R |
| 4,258,848 | 3/1981 | Akao et al. | 428/240 |
| 4,331,725 | 5/1982 | Akao | 428/138 |
| 4,337,285 | 6/1982 | Akao et al. | 428/200 |
| 4,356,224 | 10/1982 | Akao et al. | 428/220 |
| 4,359,499 | 11/1982 | Akao et al. | 428/201 |
| 4,386,124 | 5/1983 | Akao | 428/335 |
| 4,411,943 | 10/1983 | Akao | 428/161 |
| 4,411,945 | 10/1983 | Akao et al. | 428/216 |
| 4,436,809 | 3/1984 | Akao et al. | 428/207 |
| 4,452,846 | 6/1984 | Akao | 428/220 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/355 |
| 4,579,781 | 4/1986 | Akao | 428/461 |
| 4,584,234 | 4/1986 | Hirose et al. | 428/323 |
| 4,587,175 | 5/1986 | Akao | 428/139 |
| 4,629,640 | 12/1986 | Akao | 428/216 |
| 4,639,386 | 1/1987 | Akao | 428/36.92 |
| 4,653,640 | 3/1987 | Akao | 428/134 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |
| 4,708,896 | 11/1987 | Akao | 428/220 |
| 4,730,778 | 3/1988 | Akao et al. | 206/389 |
| 4,778,712 | 10/1988 | Akao | 428/215 |
| 4,778,713 | 10/1988 | Akao | 428/215 |
| 4,784,906 | 11/1988 | Akao | 428/324 |
| 4,787,506 | 11/1988 | Akao | 206/395 |
| 4,796,823 | 1/1989 | Akao et al. | 428/141 |

*Primary Examiner*—James Seidleck
*Attorney, Agent, or Firm*—Burns, Doane, Swecker & Mathis

[57] ABSTRACT

A packaging bag for photosensitive materials has an opening and welded fin sides wherein the bag and comprises a folded cylindrical coextruded multilayer inflation film having at least one light-shielding layer containing a light-shielding material, said opening being formed of the uncut ends of the folded inflation film, and said welded fin sides being formed of both cut portions of the inflation film, and a bag-making method thereof.

6 Claims, 3 Drawing Sheets

PACKAGING BAG FOR PHOTOSENSITIVE MATERIALS AND BAG-MAKING METHOD THEREOF

BACKGROUND OF THE INVENTION

1. Field of the Invention

This invention relates to a packaging bag for photosensitive materials, particularly photographic photosensitive materials.

2. Description of the Prior Art

With respect to photosensitive materials which loses the qualitative values by exposing them to light, known packaging bags can shield light completely. It is necessary that packaging bags have sufficient physical strength, such as tensile strength, tear strength and bursting strength, according to the size and the weight of the packaged materials, and have excellent heat sealing properties because the opening of the bag is heat-sealed. It is also necessary to have antistatic properties in order to prevent static electrification caused by the friction between the photosensitive material and the bag.

Heretofore, the laminated films shown in FIG. 10 and FIG. 11 were used for such packaging bags. The laminated film of FIG. 10 is composed of a light shielding low density polyethylene (LDPE) resin layer 7a containing a light-shielding material, a metal foil layer 5 and a flexible sheet layer 6 laminated in this order each through an adhesive layer 4. The laminated film of FIG. 11 is composed of a laminated film having the same layer composition as FIG. 10 and another light-shielding LDPE resin layer 7a laminated on the flexible sheet layer 6 side through an adhesive layer 4. Besides, the inventor has already developed a packaging bag for photosensitive materials using a composite laminated film composed of a cross-laminated film, where two uniaxially stretched high density polyethylene resin films laminated to each other so that their stretched directions cross at an angle of 45 to 90 degrees, and a LDPE film laminated thereon (U.S. Pat. No. 4,147,291). The inventor has also developed another packaging material for photosensitive materials using a composite laminated sheet where two or more layers of uniaxially stretched high density polyethylene resin films having a draw ratio of 2 to 4.2 times are laminated so that their stretching axes cross at an angle of 45 to 90 degrees (U.S. Pat. No. 4,258,848).

However, the conventional composite laminated films composed of LDPE resin film(s), paper, aluminum foil, cellophane and the like are inferior in physical strength, and therefore, they were made thick. As a result, they are stiff, and the packages using them are bulky, heavy and expensive. In the above composite laminated films proposed by the inventor, physical strength and light-shielding ability are improved, and the packaging material using them can be made thinner, lighter and cheaper. However, at present, it is desired to develop an improved packaging material for photosensitive materials.

SUMMARY OF THE INVENTION

An object of the invention is to provide a packaging bag for photosensitive materials having softness, heat insulating and greater physical strength as well as securing complete moistureproofness and light-shielding.

Another object of the invention is to provide a packaging bag for photosensitive materials that is curl resistant.

Another object of the invention is to provide a packaging bag for photosensitive materials more inexpensive.

Still another object of the invention is to provide a process for making such a packaging bag efficiently.

Such objects have been achieved by converting the packaging bag into a double film structure using a coextruded multilayer inflation film of thermoplastic resins of which the principal component is preferably polyolefin resin such as polyethylene resin or ethylene copolymer resin.

Thus, the packaging bag for photosensitive materials of the invention has an opening and welded fin sides, wherein the bag comprises a folded cylindrical coextruded multilayer inflation film having at least one light-shielding layer containing a light-shielding material, said opening being formed of the uncut ends of the folded inflation film, and said welded fin sides being formed of both cut portions of the inflation film.

Such a packaging bag can be made by a process which comprises, cutting a coextruded multilayer inflation film into a cylindrical piece, folding an uncut end of the deflated sheet-shaped cylindrical piece of said inflation film in parallel with the other uncut end, and welding both cut portions to form a double-sheet bag.

Figure 1:
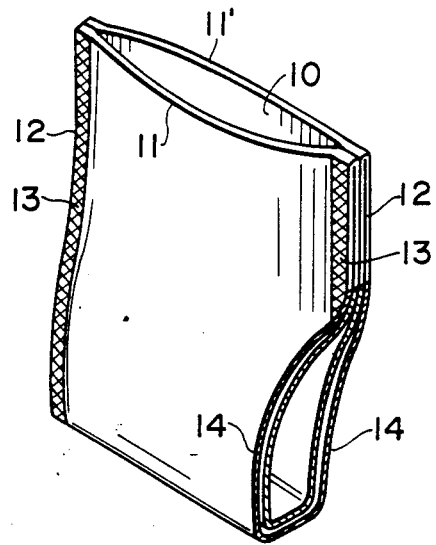
FIG. 1 is a partially cutaway perspective view of a packaging bag for photosensitive materials embodying the invention.

1, 1a... Outer layer of inflation film, 2, 2a... Inner layer of inflation film, 3, 3a... Intermediate layer of inflation film, 10... Opening, 11, 11'... Open end, 12, 12'... Cut portion, 13, 13'... Welded fin side, 14, 14'... Inflation film

DETAILED DESCRIPTION OF THE INVENTION

The coextruded multilayer inflation film is composed of two or more layers including an outer layer and an inner layer, and at least one of the layers composing the inflation film is a light-shielding layer containing a light-shielding material.

The thermoplastic resins used for the inflation film may be any resin capable of welding and molding the coextruded multilayer inflation film, and include polyethylene resins, modified polyethylene resins, polypropylene resins, propylene copolymer resins, elastomer, modified polypropylene resins, ethylene copolymer resins, modified ethylene copolymer resins, modified propylene-α-olefin copolymer resins, chlorinated polyethylene resins, chlorinated polypropylene resins, crosslinked polyolefin resins, soft polyvinyl chloride resins, polyester resins, polyamide resins, and the like. The modified resins are graft copolymers with an unsaturated carboxylic acid or its derivative. Preferable resins are various polyethylene resins including modified polyethylene resins and ethylene copolymer resins, because they have advantages in physical strength, heat sealing properties, moisture resistance, water resistance and chemical resistance and have a suitable hardness resulting is easy handling even though they are thin. The polyethylene resins include LDPE resin, medium density polyethylene (MDPE) resin and high density polyethylene (HDPE) resin, and the modified polyethylene resins include modified LDPE resin and modified HDPE resin. The ethylene copolymer resins include linear low density polyethylene (L-LDPE) resin, ethylene-vinyl acetate copolymer (EVA) resin, ethylene-ethylacrylate copolymer (EEA) resin, ethylene-methylacrylate copolymer (EMA) resin, ethylene-acrylic acid copolymer (EAA) resin, ionomer resin and the like. L-LDPE resins are particularly preferred. Therefore, in the packaging bag of the invention, both the outer layer and the inner layer of the inflation film preferably contain more than 10 wt. % of ethylene copolymer resins in view of improving heat sealing properties and physical strength. The melting point of the resin composing the outer layer is preferably higher than the inner layer in order to improve bag-making ability, adhesive strength by welding, wear resistance, appearance and the like. A preferable rain resin of the outer layer is HDPE resin, and a preferable main resin of the inner layer is L-LDPE resin. In a preferred embodiment, the principal resin component of both of the inner layer and the outer layer is L-LDPE resin, and HDPE resin is blended to the outer layer.

The L-LDPE resin is a copolymer of ethylene and α-olefin and it has a linear structure having short branches. The number of carbon atoms of the α-olefin is 3-13, preferably 4-8, more preferably 6-8, and examples are butene 1, 4-methylpentene-1, hexene-1, heptene-1 and octene-1. Preferable α-olefins are 4-methylpentene-1, hexene 1, heptene-1 and octene-1. Suitable ethylene content of L-LDPE is 85-99.5 mol. %, i.e. α-olefin content is 0.5-15 mol. %, and preferable ethylene content is 90-99.5 mol. %, i.e. α-olefin content is 0.5-10 mol. %. The density is usually in the range of 0.87-0.95 g/cm$^3$, preferably 0.87-0.94 g/cm$^3$ (ASTM D-1505), and melt index (MI) is preferably 0.8-30 g/10 minutes, most preferably 1.0-6.0 g/10 minutes (ASTM D-1238). Such a L-LDPE resin is manufactured by solution method, slurry method, vapor phase method, or modified high pressure method. Examples of L-LDPE resin are "G-RESIN", "NUC-FLX" and "TUFLIN" (trade name, UCC), "NUC Polyethylene-LL" and "TUFTHENE" (Nippon Unicar Co., Ltd.), "DOWLEX" (trade name, Dow Chemical Co., Ltd.), "STAMILEX" (trade name, DSM), "MORETEC" (Idemitsu Petrochemical Co., Ltd.), "SUCLEAR" (trade name, Dupont de Nemour, Canada), "MARLEX" (trade name, Phillips Co., Ltd.), "ULTZEX" and "NEOZEX" (trade name, Mitsui Petroleum Chemical Industries Co., Ltd.) and "NISSEKI LINIREX" (trade name, Nippon Petrochemicals Co., Ltd.).

The LDPE resin is mainly produced by the tube method or autoclave method. A preferable LDPE resin has a density of 0.915 to 0.930 g/cm$^3$ and a MI of more than 0.2 g/10 minutes, preferably more than 0.5 g/10 minutes.

At least one of the layers composing the inflation film is necessary to contain a light-shielding material. The light-shielding material can be blended with or dispersible into the prescribed resin composing the layer, and it does not transmit visible and ultraviolet rays. The light-shielding material includes various inorganic and organic pigments, such as various carbon blacks, titanium nitride graphite: iron oxide, zinc white, titanium oxide, clay, aluminum powder, aluminum paste, calcium carbonate, mica, barium sulfate, talc, cadmium pigments, red iron oxide, cobalt blue, copper-phthalocyanine pigments, monoazo and polyazo pigments and aniline black. Among these, a preferable light-shielding material is carbon black, and a particularly preferable substance is oil furnace carbon black having a pH of 5 to 9 and a mean particle size of 10 to 120 m$\mu$, particularly having a pH of 6 to 9 and a mean particle size of less than 50 m$\mu$. By using the carbon black of such pH and particle size, a packaging material having the following merits is obtained. That is, the decrease of heat seal strength, over time is small, the occurrence of fogging is rare, an increase or decrease of photosensitivity rarely happens, light-shielding ability is great, the lumps of carbon black and pinholes such as fish eyes hardly occur, and physical strength and heat sealing properties are improved. There are various methods for blending a light-shielding material, the masterbatch is preferable in view of cost, not staining working place, etc. As the preferable light-shielding material, metal powder is in second place. Metal powder is a light-reflective light-shielding material. It imparts a silver appearance which is preferable, and it is excellent in moistureproofness, light-shielding, antistatic property,, thermal shielding in the sunlight and gas barrier property. As the metal powder, aluminum powder and its paste are preferable. The paste of aluminum powder is produced by adding a liquid medium such as mineral spirits or naphtha and a pulverization assistant such as a small amount of a higher fatty acid such as stearic acid or oleic acid or a fatty acid compound to form a paste at the production of aluminum powder according to a known method such as using a ball mill, a stamp mill or an atomizer. A polyolefin thermoplastic resin, such as various polypropylene resins, various polyethylene resins, EVA resin, EEA resin or EAA resin is kneaded together with this aluminum paste under heat and volatile components mainly mineral spirits are removed by heat, a vacuum pump or the like. This product is used as aluminum paste compound resin or aluminum paste masterbatch resin. The aluminum paste masterbatch resin is preferable because noxious odors and adverse influences upon the photographic photosensitive materials are eliminated.

In order to eliminate noxious odors and adverse influences upon the photographic photosensitive materials, the content of mineral spirits should be less than 0.1 wt. %. When the aluminum paste content of coextruded double layer film is made 2 wt. % by using a masterbatch resin containing 40 wt. of aluminum paste and 1.0 wt. % of mineral spirits, one part by weight of the masterbatch resin is blended with 19 parts by weight of the main resin. Since part of the mineral spirits evaporates during molding, the final content of the mineral spirits is less than 0.05 wt. %. The aluminum powder includes microflakes produced from aluminum foil which is crushed by a ball mill or a stamp mill, in addition to typical aluminum powder manufactured by atomization, dropping on a rotary disc or evaporation from melted aluminum. Since aluminum powder is unstable, it is stabilized by a known treatment. A representative treatment is coating the surface of aluminum powder with a higher fatty acid to form the aluminum salt.

A suitable content of the light-shielding material is 0.1 to 20 wt. %. When the content is less than 0.1 wt. %. the blending effects, such as to secure light-shielding and to avoid static electrification, are insufficient. On the other hand, when the content is beyond 20 wt. %, the physical strength, particularly tear strength and impact puncture strength, of the thermoplastic resin film decreases, and the heat sealability is inferior. Moreover, the photosensitive materials are contaminated by the light-shielding materials released from the inflation film. Two or more kinds of the light-shielding materials may be combined.

The light-shielding material may be incorporated into the outer layer, the inner layer or other layers, however, when the light-shielding material is incorporated into one layer, it is preferable that it be incorporated into the outer layer or an intermediate layer. When the light-shielding material is incorporated into all layers including the outer layer, the inner layer and intermediate layer(s), the light shielding ability of the packaging bag can be further secured. When the light shielding material is incorporated into the outer layer and the inner layer, it is preferable that a light-reflective material of metal powder such as aluminum powder is incorporated into the outer layer and a light-absorptive material of carbon black is incorporated into the inner layer.

The inflation film of the invention may contain other additives such as lubricant, antistatic agent, antioxidant and the like.

The lubricant includes:

Oleic acid amide lubricants; "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; Dimethylpolysiloxanes, etc. (Sinetsu Chemical Co., Ltd., Toray Silicone Co., Ltd.), etc.

Alkylamine lubricants; "ELECTROSTRIPPER TS-2" (Kao Corp.) etc.

Preferable lubricants include the fatty acid amide lubricants having a number of carbon atoms of 8 to 50, preferably 15 to 35. Two or more lubricants may be combined. A suitable content of the lubricant is less than 2 wt. %, particularly 0.01 to 1.0 wt. %, and it should be a minimum amount, when it is used for the package for photographic photosensitive materials. Two or more kinds of the lubricants may be combined.

The antistatic agent includes anionic antistatic agents such as alkylphosphate esters, cationic antistatic agents such as alkylamine derivatives and quarternary ammonium salts, and ampholytic antistatic agents such as imidazoline metal salts, and nonionic antistatic agents such as polyoxyethylene alkylamines, polyoxyethylene fatty acid esters and polyoxyethylene alkyl ethers. A suitable content of the antioxidant is less than 3.0 wt. %, particularly 0.03 to 1.5 wt. %. Two or more kinds of the antistatic agent may be combined.

Suitable antioxidants are phenol antioxidants, sulfur-containing antioxidants, phosphorus-containing antioxidants and the like. The phenol antioxidants include n-octadecyl-3-(3',5'-di-t-butyl-4'-hydroxyphenyl)propionate, 2,6-di-t-butyl-4-methylphenol, 2,6-di-t-butyl-p-cresol (BHT),2,2'-methylenebis(4-methyl-6-t-butylphenol), 4,4'-thiobis(3-methyl-6-t-butylphenol), 4,4'-butylidenebis(3-methyl-6-t-butylphenol), stearyl-$\Delta$-(3,5-di-4 butyl-4-hydroxyphenyl)propionate, 1,1,3-tris(2-methyl-4-hydroxy-5-t-butylphenyl)butane, 1,3,5-trimethyl 2,4,6-tris(3,5-di-t-butyl-4-hydroxybenzyl) benzene, octadecyl-3 (3,5-di-t-butyl-4-hydroxyphenyl) propionate and tetrakis methylene-3(3',5'-di-t-butyl-4'-hydroxyphenyl)propionate methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphospate, etc. Particularly preferred antioxidants are phenol antioxidants. Two or more kinds of the antioxidants may be combined. A suitable content of the antioxidant is in the range not adversely affecting photosensitive materials, i.e. 0.001 to 1 wt. %, irrespective of the case of single antioxidant or the case of a combination of two or more antioxidants. When the content is less than 0.001 wt. %, the blending effect hardly appears. While, when the content is beyond 1 wt. %, photographic film utilizing an oxidation-reduction reaction is adversely influenced by the antioxidant. In order to avoid the adverse influence, the content of the antioxidant is typically the minimum amount capable of preventing coloring troubles and the generation of lumps. When the antioxidant is combined with carbon black, an oxidation inhibition effect synergistically appears.

The thickness of the outer layer is usually 5 to 100 $\mu$m, and the thickness of the inner layer is usually 5 to 100 $\mu$m. The inflation film may contain one or more intermediate layers. The intermediate layer may be composed of the aforementioned resin usable for the outer layer or the inner layer, and may contain the aforementioned additives. The resin composition of the intermediate layer may be the same as the outer layer or the inner layer. In any event, the total thickness of the inflation film is preferably 20 to 200 $\mu$m.

The inflation film may be unstretched, biaxially molecularly oriented or longitudinally, laterally or obliquely uniaxially molecularly oriented. Preferable inflation films are obliquely uniaxially molecularly oriented films manufactured by using an apparatus disclosed in Japanese Patent KOKAI Nos. 47-34656 or 48-100464, or Japanese Patent KOKOKU No. 53-18072.

In the packaging bag of the invention, the uncut ends may be allowed to deviate from each other to form a tongue portion as well as may be in accord with each, other The bottom portion of the bag is not necessarily limited to a folded state, but it may be a welded fin side in order to decrease the play portion of the bag. Respective welded portions may be embossed partially or entirely with parallel or lattice-shaped furrows or projection lines or the like during inflation film molding, welding or other processes, in order to strengthen the adhesion between the inner layers of the coextruded multilayer inflation film. The packaging bag of the invention is a double-sheet bag, and the outer layer of the inflation film composes both of the outer surface and the inner surface of the bag. While, the inner layer of the inflation film is disposed inside, and may contact each other. Such inner layers may be in a state of pseudo adhesion formed by blocking.

The size and the ratio of the length to the width can be varied by changing the lay-flat width, the cutting width, the folding width and the like.

When the packaging bag of the invention is made, the inflation film formed by a multilayer coextrusion inflation molding machine is cut at regular intervals consistent with the width of the bag in the direction perpendicular to the longitudinal direction of the web of the inflation film, without winding or after winding. The cut cylindrical piece of the inflation film being in a deflated sheet-shaped state is folded so that respective uncut ends are disposed in parallel with (including in accord with) each other, and the superposed side cut portions are welded to complete bag-making. The cutting of the inflation film may be carried out by a thermal means using a hot plate, a laser cutter, an ultrasonic cutter, a hot wire or, the like, as well as by a mechanical means. In particular, rotary cutter, laser cutter, guillotine cutter or the like, may be used. The welding may be carried out by hot bar sealing, hot roll sealing, impulse sealing, hot air sealing, side welding, hot knife cut sealing, high-frequency sealing, ultrasonic sealing, a combination thereof or the like. The cutting, folding and welding may be carried out at once by combining a cutting apparatus with a folding apparatus and a welding apparatus.

The packaging bag of the invention is suitable for packaging photographic photosensitive materials, such as silver halide photographic photosensitive materials, diazo photographic photosensitive materials, photosensitive resins, self developing type photographic photosensitive materials, diffusion transfer type photographic photosensitive materials and other photographic materials which are degraded by a small amount of light or moisture or gas, and it is particularly suitable for packaging a roll of strip material, such as photographic film, movie picture film, microphotographic film or film for computerized type setting system or paper for computerized type-setting system. However, the packaging bag of the invention may be used for any material degraded by light, such as medicines, chemical substances, food and the like, requiring low dusting characteristics for their packages. The bag-making method of the invention may be applied not only to the bag-making of the packaging bag for photosensitive materials but also to the bag-making of any other packaging bag utilizing a coextruded multilayer inflation film.

Since the packaging bag of the invention has a double-sheet structure of a multilayer inflation film of which the principal component is a thermoplastic resin, preferably polyethylene resin and/or ethylene copolymer resin, it is strong due to its raw material, and therefore it is made thin and light. The multilayer inflation film can have various combinations of layers having different properties. The outer layer of the multilayer inflation film bears physical strength, and improves bag-making ability, welded strength and appearance by using a high-melting point resin. While, the inner layer bears heat sealing properties, and improves light-shielding, antistatic effect and the like by blending a light-shielding material such as carbon black. Moreover, since various additives may be blended into the inner layer since it is covered with the outer layer, the light-shielding effect and the antistatic effect can be improved, and other various properties can be imparted. Since the packaging bag has a double-sheet structure, it is excellent in physical strength, such as tear strength and impact puncture strength. Moreover, the packaging bag is flexible, and it is concordant with the packaged articles.

Since the opening portion of the packaging bag is composed of uncut portions, the article to be packaged can be easily inserted and taken out. The packaging bag of the invention is thin, light and flexible, and nevertheless, it is excellent in physical strength and light-shielding ability and heat insulating ability. Since various additives can be incorporated into the inner layer without adverse affects upon the packaged articles, the packaging bag is excellent in light-shielding, antistatic property and moistureproofness. Since the bag can be made in a simple process without imparting strain, curling and deviation do not occur. Since the size and the ratio of the length to the width of the bag readily is varied, the bag can be used for various articles, inexpensively.

EXAMPLES

An example of the packaging bag of the invention is illustrated in FIG. 1. The packaging bag is formed of a cylindrical piece of a coextruded multilayer inflation film 14 which is deflated to sheet-shaped. The inflation film 14 is folded in the lateral direction of the inflation film so that both of the uncut ends 11,11' are coincide with each other to form an opening 10 of the bag. Both cut portions 12,12 are welded to form welded portions 13,13 embossed with diagonal lattice projection pattern. As shown in the drawing, the packaging bag has a double-sheet structure.

Figure 2:
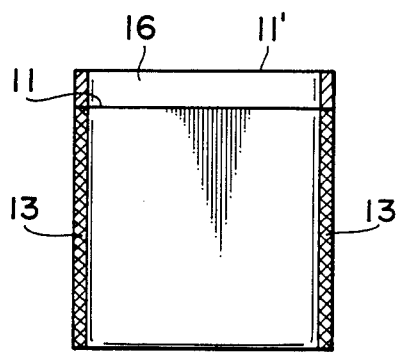
FIGS. 2 and 3 are plan views of two other packaging bags for photosensitive materials also embodying the invention.

Another example of the packaging bag of the invention. is illustrated in FIG. 2. In this packaging bag, the open ends 11,11' are deviated from each other to form a tongue portion 16.

Figure 3:
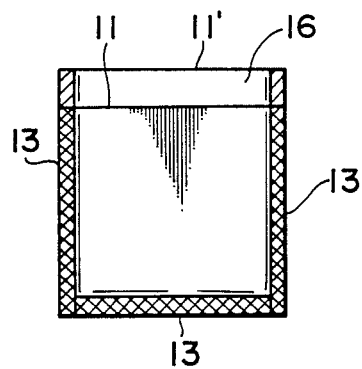

Still another example of the packaging bag of the invention is illustrated in FIG. 3. In this packaging bag, the bottom portion is also welded to form a welded portion embossed with diagonal lattice projection pattern, as well as the open ends 11,11' are deviated from each other to form a tongue portion 16.

Figure 4:
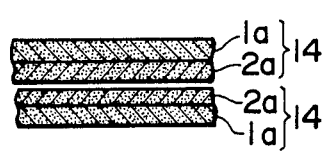
FIGS. 4 and 5 are partial sectional views of packaging bags of the invention.

A layer composition of the packaging bag of the invention is illustrated in FIG. 4. The inflation film 14 is composed of two layers, i.e. a light-shielding outer layer 1a containing a light-shielding material and a light-shielding inner layer 2a containing a light shielding material. Two inflation films 14,14 are disposed symmetrically, and both inner layers 2a,2a are in contact with each other.

Figure 5:
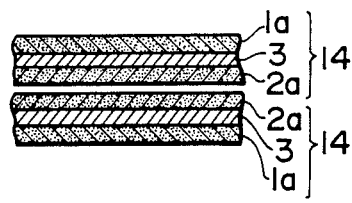

Another layer composition of the packaging bag of the invention is illustrated in FIG. 5. The inflation film is composed of three layers i.e. a light-shielding outer layer la containing a light-shielding material, an intermediate layer 3 and a light-shielding inner layer 2a. Two inflation films 14,14 are disposed symmetrically, and both inner layers 2a,2a are in contact with each other.

Figure 6:
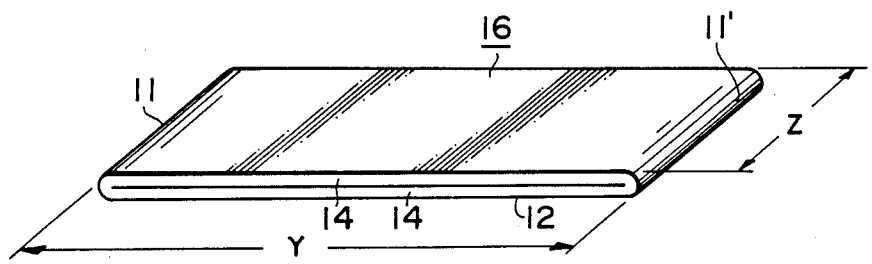
FIG. 6 is a perspective view of a cut inflation film used for making the bag of the invention.
Figure 7:
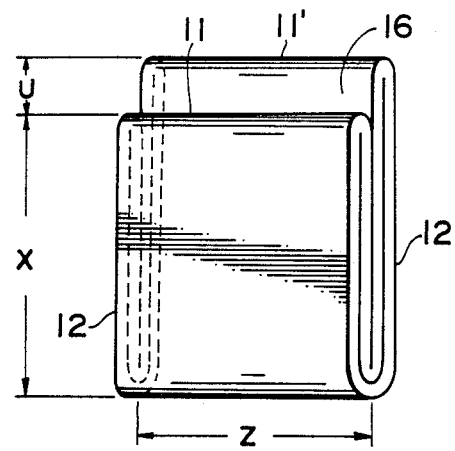
FIG. 7 is a perspective view indicating a folded state thereof.

When the packaging bag is made, a coextruded multilayer inflation film having a width Y is molded by an inflation molding machine. The inflation film is, deflated, in a sheet shape by passing a nip roll and the film is cut in the cross direction of the inflation film at regular intervals of the length Z to obtain rectangular sheet-shaped cylindrical pieces 16 shown in FIG. 6. The sheet-shaped cylindrical piece 16 is folded in the folding length x so that both open ends 11,11' are deviated having a deviation length U as shown in FIG. 7. The superposed side cut portions 12,12 are welded to complete the packaging bag shown in FIG. 2. The width of the sheet-shaped inflation film is 61 cm, the folding length is 30 cm, the deviation length, i.e. the length of the tongue portion 16 is 1 cm, and the width of the welded portions is 0.5 cm.

Figure 8:
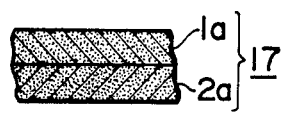
FIGS. 8 and 9 are partial sectional views of comparative packaging bags.

FIG. 8 indicates the layer composition of a comparative single-sheet packaging bag made of a coextruded double layer inflation film consisting of a light-shielding outer layer la containing a light-shielding material and a light-shielding inner layer 2a containing a light-shielding material.

Figure 9:
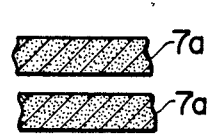
Figure 10:
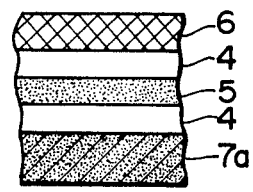
FIGS. 10 and 11 are partial sectional views of conventional packaging bags.

FIG. 9 indicates the layer composition of another comparative double-sheet packaging bag made of two sheets of a single layer inflation film consisting of a light-shielding LDPE resin film layer 7a containing a light-shielding material.

Subsequently, several packaging bags were made, and various properties of the packaging bags were measured.

Packaging Bag of the Invention I

The packaging bag of the invention I has a layer composition of FIG. 4. The inner layer 2a has a thickness of 30 μm, and is composed of 96.55 wt. % of L-LDPE resin being a copolymer resin of ethylene and 4-methylpentene-1 having a density (ASTM D-1505) of 0.920 g/cm³, a MI (ASTM D-1238) of 2.1 g/10 minutes and a Vicat softening point (ASTM D-1525) of 100° C., 3.0 wt. % of oil furnace carbon black, 0.2 wt. % of an alkylamine antistatic agent, 0.05 wt. % of oleic acid amide and 0.2 wt. % of a phenol antioxidant. The outer layer la has a thickness of 30 μm, and is composed of 76.95 wt. % of L-LDPE resin being a copolymer resin of ethylene and 4-methylpentene-1 having a density of 0.920 g/cm³, a MI of 2.1 g/10 minutes and a Vicat softening point of 100° C., 20.0 wt. % of HDPE resin having a density of 0.95 g/cm³, a MI of 1.1 g/10 minutes and a Vicat softening point of 126° C, 3.0 wt. % of oil furnace carbon black and 0.05 wt. % of oleic acid amide. Such an inflation film was molded by a double layer coextrusion inflation molding machine, and was made into a bag shown in FIG. 2 having a size of 25 cm in length x 31 cm in width. Both inner layers 2a,2a facing each other were joined by pseudo adhesion caused by blocking.

Packaging Bag of the Invention II

The packaging bag of the invention II has a layer composition of FIG. 4. The inner layer 2a has a thickness of 30 μm, and is composed of 96.45 wt. % of L-LDPE resin being a copolymer resin of ethylene and butene-1 having a density of 0.890 g/cm³, a MI of 1.0 g/10 minutes and a Vicat softening point of 75° C., 3.0 wt. % of oil furnace carbon black, 0.3 wt. % of an alkylamine antistatic agent, 0.05 wt. % of oleic acid amide and 0.2 wt. % of a phenol antioxidant. The outer layer la has a thickness of 30 μm, and is composed of 96.75 wt. % of L-LDPE resin being a copolymer resin of ethylene and 4-methylpentene-1 having a density of 0.920 g/cm³, a MI of 2.1 g/10 minutes and a Vicat softening point of 100° C., 3.0 wt. % of oil furnace carbon black, 0.05 wt. % of oleic acid amide and 0.2 wt. % of a phenol antioxidant. The inflation film was molded by a double layer coextrusion inflation film molding machine, and was made into a bag shown in FIG. 2 having a size of 25 cm in length x 31 cm in width. Both inner layers 2a,2a facing each other was joined by pseudo adhesion caused by blocking.

Packaging Bag of the Invention III

The packaging bag of the invention III has a layer composition of FIG. 4. The inner layer 2a has a thickness of 30 μm, and is composed of 60 wt. % of ethylene-ethylacrylate copolymer resin having an ethylacrylate unit content of 18%, a density of 0.930 g/cm³, a MI of pb 6 g/10 minutes and a Vicat softening point of 56° C., 36.55 wt. % of L-LDPE resin being a copolymer resin of ethylene and octene-1 having a density of 0.920 g/cm³, a MI of 2.0 g/10 minutes and a Vicat softening point of 96° C., 3.0 wt. % of oil furnace carbon black, 0.2 wt. % of an alkylamine antistatic agent, 0.1 wt. % of oleic acid amide and 0.15 wt. % of a phenol antioxidant. The outer layer la has a thickness of 30 μm and the same resin composition as the outer layer la of the packaging bag of the invention II. The inflation film was molded by a double layer coextrusion inflation film molding machine, and was made into a bag shown in FIG. 2 having a size of 25 cm in length x 31 cm in width. Both inner layers 2a,2a facing each other were joined by pseudo adhesion caused by blocking.

Comparative Packaging Bag I

The comparative packaging bag I has a layer composition of FIG. 8. The resin compositions of the outer layer la and the inner layer 2a are the same as those of the packaging material of the invention I, and the layer thicknesses of both layers are the same 60 μm, i.e. total thickness of the inflation film is 120 μm. The inflation film was molded by a double layer coextrusion inflation film molding machine, and was made into a single-sheet bag having a shape shown in FIG. 2 and a size of 25 cm in length x 31 cm in width.

Comparative Packaging Bag II

The comparative packaging bag II has a layer composition of FIG. 9. The light-shielding LDPE resin layer 7a has a thickness of 60 μm, and is composed of 97.0 wt. % of LDPE resin having a density of 0.923 g/cm³ and a MI of 2.4 g/10 minutes and 3.0 wt. % of oil furnace carbon black. This inflation film was molded by an inflation molding machine, and was made into a double-sheet bag shown in FIG. 2 having a size of 25 cm in length x 31 cm in width according to the same bag-making method as the packaging bag of the invention I.

Conventional Packaging Bag I

Figure 11:
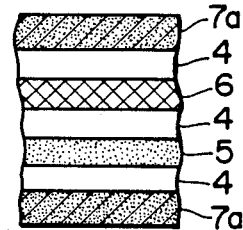

The conventional packaging bag I has a layer composition of FIG. 11, and is composed of a light-shielding LDPE resin layer 7a 50 μm thick having the same resin composition as the comparative packaging bag II, an aluminum foil 5 having a thickness of 7 μm, a bleached kraft paper having an areal weight of 35 g/m² and another light-shielding LDPE resin layer 7a 50 μm thick having the same resin composition as the comparative packaging bag II laminated each through an LDPE resin extrusion laminating adhesive layer 4 having a thickness of 13 μm. This laminated film was made into a single-sheet bag having a shape shown in FIG. 2 and a size of 25 cm in length x 31 cm in width.

Various properties of these bags were measured, and shown in Table 1.

TABLE 1

|  | Invention | | | Comparative | | Conventional |
| --- | --- | --- | --- | --- | --- | --- |
|  | I | II | III | I | II | I |
| Layer Composition | FIG. 4 | FIG. 4 | FIG. 4 | FIG. 8 | FIG. 9 | FIG. 11 |
| Bag Shape | FIG. 2 | FIG. 4 | FIG. 4 | FIG. 8 | FIG. 9 | FIG. 11 |
| Bag-Making Ability | B | B | B | D-E*¹ | D*² | C*³ |
| Bag Rupture Strength | A | A | A | B | D | D |
| Antistatic Properties | B | B | B | B | D-E | B |
| Flexibility | A | A | A | D-E | A | D-E |
| Tear Strength | A | A | A | A-B | D | D-E |
| Curling | A | A | A | E | A | B |

*¹Greatly curled and difficult to make a bag.
*²Wrinkling occurred.
*³Heat seal strength was unstable.

Evaluations in Table 1 were carried out as follows:

| A very excellent | B excellent |
| --- | --- |
| C practical | D having a problem |
| E impractical | |

Testing methods were as follows:

Bag-Making Ability: Judged by the facility to make the bag shown in FIG. 2, heat sealing properties, the insertion of a roll of movie picture film and the like.

Bag Rupture Strength: 1 kg of sand was placed in each exemplified bag, and heat-sealed. The bag was dropped from 1 m height to a floor, and the bag rupture strength was judged by the dropping times until the bag ruptured.

Antistatic Properties: Judged by the generation degree of static electricity by the friction at the time of insertion and taking out of a roll of movie picture film under prescribed temperature and humidity.

Flexibility: Judged by the workability at the time of the folding of the deflated inflation film and the insertion of a roll of movie picture film.

Tear Strength: According to JIS P-8116.

Curling: Judged by the curled degree of each exemplified inflation film under a no-load state at 20° C. at 65 % RH in humidity.

We claim:

1. A packaging bag for photosensitive materials comprising a cylindrical coextruded multilayer inflation film having a sidewall and first and second open ends and having at least one light-shielding layer containing a light-shielding material, said cylindrical coextruded multilayer inflation film being flattened and folded to form a bottom portion of the packaging bag extending between said first and second open ends, and said folded film being welded along said first and second open ends to form sides of the packaging bag whereby portions of side sidewall form an opening of the packaging bag.

2. The packaging bag of claim 1 wherein said portions of said sidewall forming the opening of the packaging bag deviate from each other in parallel to form a tongue portion.

3. The packaging bag of claim 1 wherein the bottom portion is a creased fold.

4. The packaging bag of claim 1 wherein the sides of the packaging bag are embossed.

5. The packaging bag of claim 1 wherein the inner layers of the inflation film of the bag are in a state of pseudo adhesion to each other due to blocking.

6. The packaging bag of claim 1 wherein the inner layer and the outer layer of the inflation film are comprised of at least one member selected from polyethylene resins, modified polyethylene resins and ethylene copolymer resins and the melting point of the resin composing the outer layer is higher than the melting point of the inner layer.

* * * * *